United States Patent
Chan et al.

[11] Patent Number: 5,904,983
[45] Date of Patent: May 18, 1999

[54] CORROSION-RESISTANT OPTICAL FIBERS AND WAVEGUIDES

[75] Inventors: Maureen Gillen Chan, New Providence; Daryl Inniss, Hillsborough; Howard Edan Katz, Summit; Valerie Jeanne Kuck, Upper Montclair; Marcia Lea Schilling, Basking Ridge, all of N.J.

[73] Assignee: Lucent Technologies Inc., Murray Hill, N.J.

[21] Appl. No.: 08/862,403

[22] Filed: May 23, 1997

Related U.S. Application Data

[63] Continuation of application No. 08/412,787, Mar. 29, 1995, abandoned.

[51] Int. Cl.[6] ..................................................... C08J 5/08
[52] U.S. Cl. ..................... 428/392; 428/367; 428/368; 428/375; 428/389; 428/388; 385/123
[58] Field of Search ..................... 428/367, 375, 428/368, 389, 373, 388, 390, 392, 426, 432, 433; 385/123

[56] References Cited

U.S. PATENT DOCUMENTS

| | | |
|---|---|---|
| 4,473,599 | 9/1984 | Elion . |
| 4,525,026 | 6/1985 | Elion . |
| 4,725,123 | 2/1988 | Anelli et al. . |
| 4,921,731 | 5/1990 | Clark et al. . |
| 5,033,815 | 7/1991 | Edahiro et al. ............. 350/96.34 |
| 5,067,975 | 11/1991 | Backer et al. ................. 65/3.12 |
| 5,212,757 | 5/1993 | Brownlow et al. ............ 385/127 |
| 5,214,734 | 5/1993 | Inniss et al. ................. 385/128 |

FOREIGN PATENT DOCUMENTS

| | | |
|---|---|---|
| 0214331 | 3/1987 | European Pat. Off. . |
| 90122611 | 11/1990 | European Pat. Off. ........ C03C 13/04 |
| 56-088852 | 7/1981 | Japan . |
| 4-260008 | 9/1992 | Japan . |

OTHER PUBLICATIONS

Matejec, V. et al., "Mechanical Strength of Optical Fibers Coated By Thin Oxide Layers Prepared By Sol–Gel Method," *Chemical Abstracts*, Issue 5, 1995, Abstract only, 122:112628e.

*Primary Examiner*—William Krynski
*Assistant Examiner*—J. M. Gray

[57] ABSTRACT

An optical fiber protected from degradation caused by corrosion from environmental fluids. The optical fiber includes a core-cladding assembly surrounded with a thin quasi metal oxide film (preferably ~10 nm in depth). Over time, particularly under the influence of the elevated temperatures, the initially deposited reagents of the thin film oxidize or hydrolyze, removing the organic components, and bonding a quasi metal oxide film on the surface of the cladding. The resulting film significantly retards corrosion by blocking the environmental fluids from reacting with flaws in the cladding surface of the fiber, thus improving the mechanical performance and reliability of the optical fiber. In addition, the thin film protects the fiber against incidental abrasions. Alternatively, the quasi metal oxide reagents are deposited into a protective polymer layer of the fiber or a filling compound of a fiber cable, rather than directly onto the cladding surface, whereby the same protective effect is achieved when the reagents diffuse through the polymer layer or filling compound to the core-cladding surface.

22 Claims, 8 Drawing Sheets

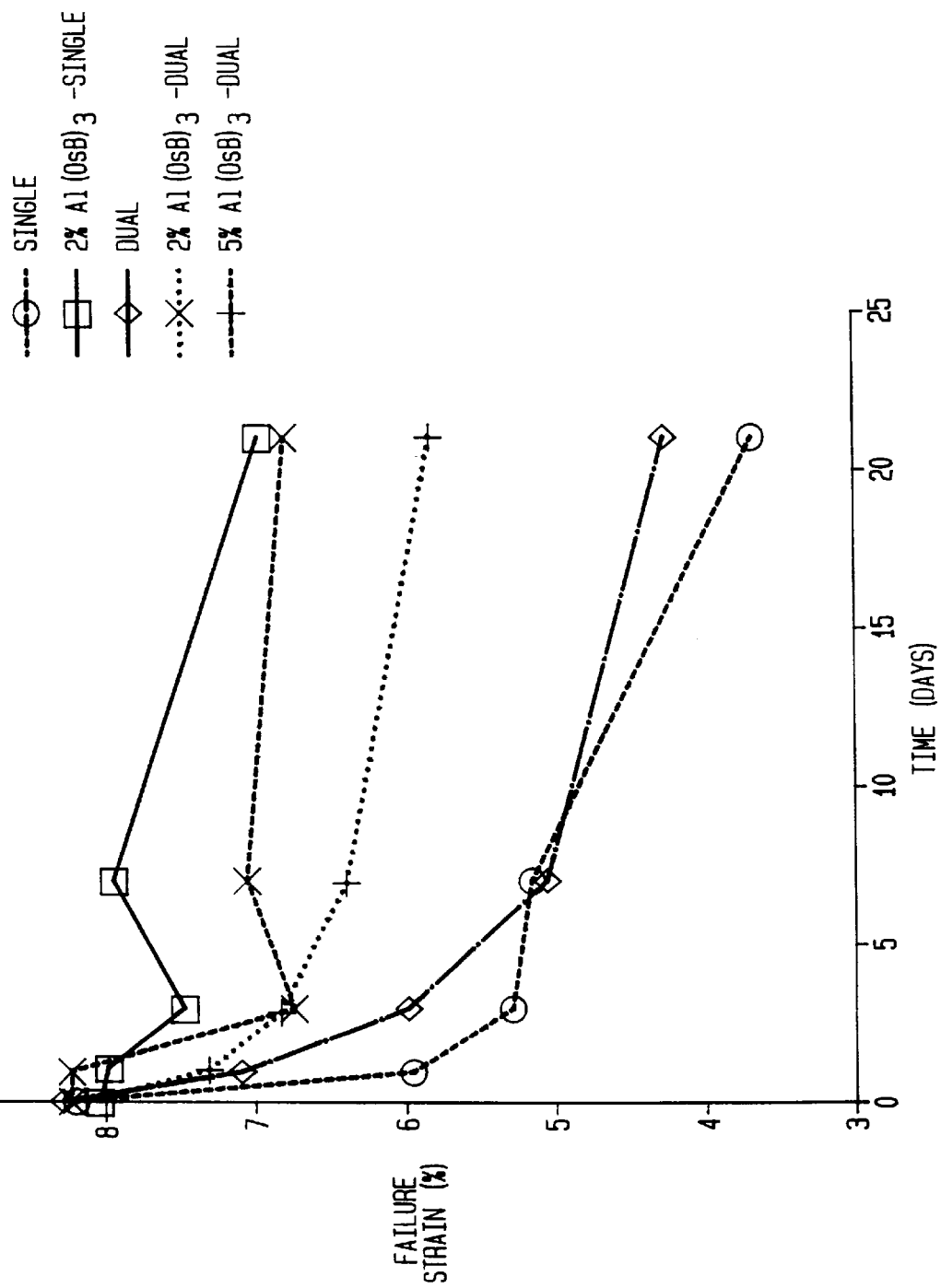

CORROSION-RESISTANT OPTICAL FIBERS AND WAVEGUIDES

This is a Continuation of application Ser. No. 08/412,787 filed Mar. 29, 1995, now abandoned.

BACKGROUND OF THE INVENTION

1. Field of the Invention

The present invention relates to optical fibers and waveguides. More particularly, the present invention relates to corrosion-resistant optical fibers and waveguides which include thin quasi metal oxide films or reagents for improved mechanical performance.

2. Related Art

Until recently, optical fibers and waveguides were generally limited to the field of telecommunication. Correspondingly, optical fibers were used in relatively protected environments, such as subterranean cabling. Newer applications, which include fiber to the home (e.g., for cable television) and longer spans of submarine cabling, place more demanding mechanical requirements on optical fibers. Thus, it has become imperative that the fiber itself be more corrosion-resistant.

In general, an optical fiber includes a core, a cladding, and one or more protective layers. The core is the center of the optical fiber and serves as the medium for transmitting light encoded information. The cladding which surrounds the core is also transparent, but it has a lower refractive index to confine the light to the core. The core and cladding can have any of a broad range of dimensions and can be comprised of silica and other glass compounds.

The core-cladding assembly optionally has protective coatings of polymeric buffers, metals, metal oxides, or nitrides. These protective buffer materials are often carried in an outer covering layer over the cladding. Surrounding this buffer may be one or more additional protective layers which may be polymerized, braided, or woven about the fiber.

Conventional fibers can suffer from damage caused by both abrasion and corrosion (defined as zero-stress aging, or the breaking of silicon-oxygen (Si—O) bonds when a fiber is not under mechanical stress) and/or fatigue. The intrinsic strength of pristine glass optical fibers is very high, on the order of 1,000,000 psi for silica-based fibers, for example. In addition, freshly drawn fibers are usually flaw free, as has been demonstrated by their unimodal strength distribution and their inert strength close to the theoretical value. The outer surface of the cladding, however, is very brittle and prone to surface imperfections (e.g., abrasions, cracks, or flaws). Typically, optical fibers fail from these flaws when placed under sufficient tensile stress. It is well known that flaws in fibers grow subcritically prior to failure when subjected to tensile stress in the presence of environmental fluids such as water, ammonia, or other corrosive agents (e.g., acids or bases). Research indicates that the environmental fluids, for example water molecules, enter these tiny preexisting flaws or cracks of stressed fiber and react with silicon and oxygen at the opening of the crack rupturing the silicon-oxygen (Si—O) bonds. This phenomenon of subcritical crack growth is known as fatigue and greatly impacts the long-term reliability of optical fibers. Accordingly, the long-term mechanical reliability of optical fibers is governed, in part, by the rate of flaw initiation and growth. Although fiber breaks in the field are still extremely rare due to these mechanisms, the possibility appears to be greater under the more demanding conditions of new applications.

Indeed, while the latest surveys indicate that optical performance factors such as attenuation and dispersion remain important, mechanical performance is increasingly being voiced as the predominate concern. At the same time, however, applications are requiring higher fiber-count cables, shorter cable runs, and increased handling and splicing capabilities. Correspondingly, this equates for the need of smaller diametered fibers with greater mechanical reliability.

Research has focused on understanding both abrasion and corrosion resistance for some time. As a result, much effort has been devoted to the elimination of surface flaws by careful handling during and after fiber drawing, by protective coatings, and by various treatments to the cladding surface. Conventional solutions broadly fall into one of four categories: modifications of the outermost layer of the core-cladding fiber assembly (not by coating, but rather by modifying the silica itself); alterations to the polymer material of the protective layers; enhancements to the adhesion between the core-cladding assembly and the polymer protective layers; and developments of new coatings (typically greater than 0.18 mm in depth) for the outer surface of the cladding.

These conventional solutions, however, have several drawbacks. The first category of solution involves improving the silica itself by integrating reagent particles (e.g., titanium) into the outer cladding itself. However, these hard macroscopic films require considerably force and tension for cleaving.

The second category of solutions include putting micron-sized metal oxide particles (e.g., titania, silica, or alumina) into the protective polymer to retard corrosion. The limitations associated with this method could include micro bending losses, polymer degradation, and poor adhesion of coating to silica. A micro bend is a distortion or abrupt bend in the core-cladding caused by localized stresses (i.e., a site where a metal oxide particle imparts the core-cladding assembly). When a bend is abrupt, the light angle of incidence at the internal surface becomes large and is no longer substantially reflected, thus causing the loss of transmission power.

With the third category of conventional solutions, even with good adhesion of optical fiber protective layers to silica, environmental fluids will be absorbed and transmitted under high temperature, pressure, or humidity to the core-cladding assembly of the fiber. Thus the slow, but nevertheless persistent, penetration of these environmental substances through the outer protective layers will, over time, result in the corrosion of the core-cladding assembly destroying not only its tensile strength, but its optical transmission properties.

The fourth class conventional solution generally involves one of two processes: the pyrolysis of titanium tetrachloride, hydrogen, and oxygen which is blasted at the fiber as it is drawn, creating macroscopic film on the surface of the cladding or depositing a film of titanium silicate glass (5 microns in depth). In addition to being still susceptible to environmental fluids with aging, the pyrolysis process is generally not pragmatic since it requires high energy, temperature, and pressure with these very reactive gasses.

SUMMARY OF THE INVENTION

The present invention is an optical fiber protected from degradation caused by both abrasion and corrosion, particularly under high temperature and humidity. The optical fiber includes a core-cladding assembly surrounded with a thin quasi metal oxide film (preferably ~10 nm in depth) and a protective polymer layer. The "quasi metal oxide" is defined as a material comprising primarily metal oxide, but which also may contain residual ligand.

The present invention provides an effective and pragmatic solution to optical fiber abrasion and corrosion. Over time, particularly under the influence of the elevated temperatures, the initially applied reagents of the thin film oxidize or hydrolyze, forming the thin quasi metal oxide film on the surface of the cladding. The resulting film significantly retards corrosion by blocking the environmental fluids from reacting with flaws in the cladding surface of the fiber, thus improving the mechanical performance and reliability of the optical fiber. In addition, the metal reagents provide protection against incidental abrasions.

Furthermore, the thin quasi metal oxide film is deposited on the outer surface of the core-cladding assembly by any number of low cost, chemical processes, including spraying the reagents on the fiber after draw, dipping the fiber through a reagent solution, mixing the reagents with existing polymer coating resins, exposing the fiber to a reagent vapor, incorporating the reagents into new polymeric coatings, or absorbing them into sol-gel-cladding preforms. Thus, the present invention teaches a protection mechanism (i.e., the thin quasi metal oxide film) which does not require any high cost or energy processes.

In addition, fibers according to the present invention can be easily cleaved for splicing due to the ultra-thin characteristics of the film.

Other embodiments of the present invention include incorporating the reagents into a polymer coating or a coloring layer of a fiber to introduce the reagents to the cladding surface. Similar, the reagents can be integrated into a matrix polymer surrounding a fiber ribbon.

An alternative embodiment of the present invention is a fiber optic cable. In this embodiment, the reagents are additionally incorporated in a filling compound of a fiber cable, whereby the reagents penetrate the protective layers and react with the core-cladding surfaces of each fiber. Cables thus treated also exhibit a substantially increased life time, preserving for greater periods their tensile strength and desired optical properties.

The foregoing and other features and advantages of the invention will be apparent from the following, more particular description of the preferred embodiments of the invention, as illustrated in the accompanying drawings.

BRIEF DESCRIPTION OF THE FIGURES

FIG. 7 is a failure strain diagram of the fibers coated with Al containing resins plotted as a function of aging time and compared to control fibers.

DETAILED DESCRIPTION OF THE PREFERRED EMBODIMENTS

The preferred embodiments of the invention are discussed in detail below. While specific model numbers and/or configurations are discussed, it should be understood that this is done for illustration purposes only. A person skilled in the relevant art will recognize that other components and configurations may be used without parting from the spirit and scope of the invention.

The preferred embodiments of the invention are now described with reference to the figures where like reference numbers indicate like elements. Also in the figures, the left most digit of each reference number corresponds to the figure in which the reference number is first used.

Figure 1:
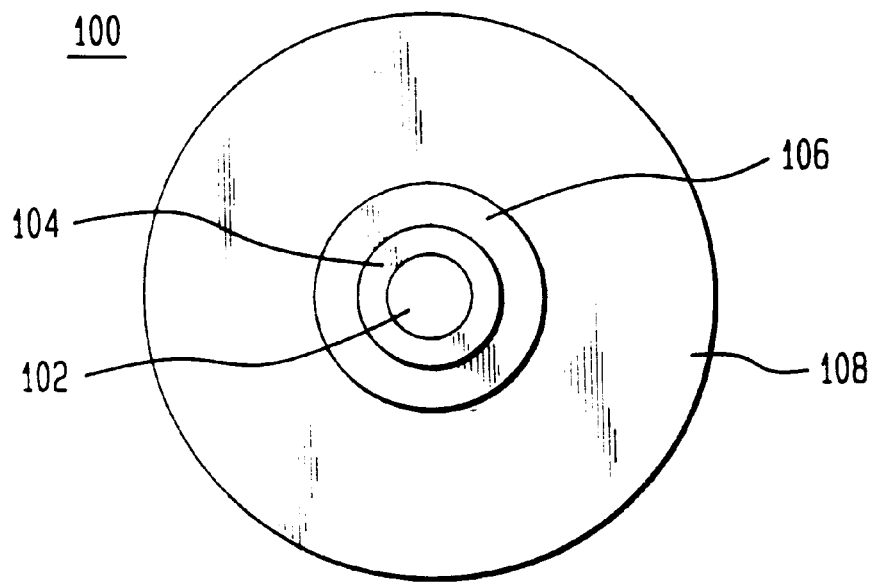
FIG. 1 illustrates a cross sectional end view of a silica-based optical fiber 100 with a thin quasi metal oxide film 106 deposited on the outer surface of a cladding 104.
Figure 2A:
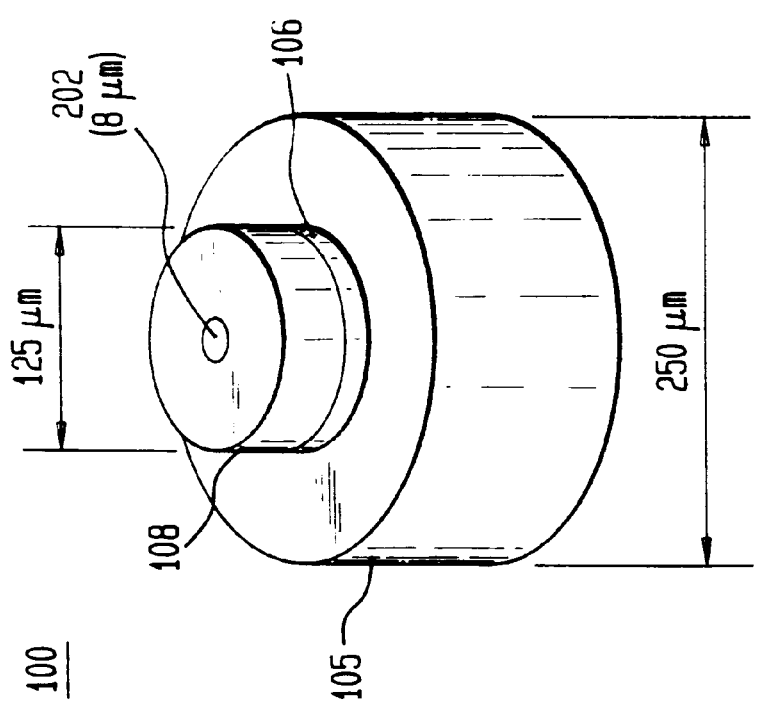
FIGS. 2(A)–(B) are schematic drawings of optical fibers 100 and 200 with single and dual polymer protective layers, respectively.

FIGS. 1 and 2(A) illustrate a cross sectional end view and a schematic diagram of a silica-based optical fiber 100 according to the present invention. Fiber 100 includes a core 102 (8 $\mu$m in diameter) and a cladding 104, collectively referenced as core-cladding assembly 102–104 (125 $\mu$m in diameter), a thin quasi metal oxide film 106 (~10 nm in depth) deposited on the outer surface of cladding 104. In general, the thin quasi metal oxide film can be a monolayer or more, but less than 5 $\mu$m in depth.

Figure 2B:
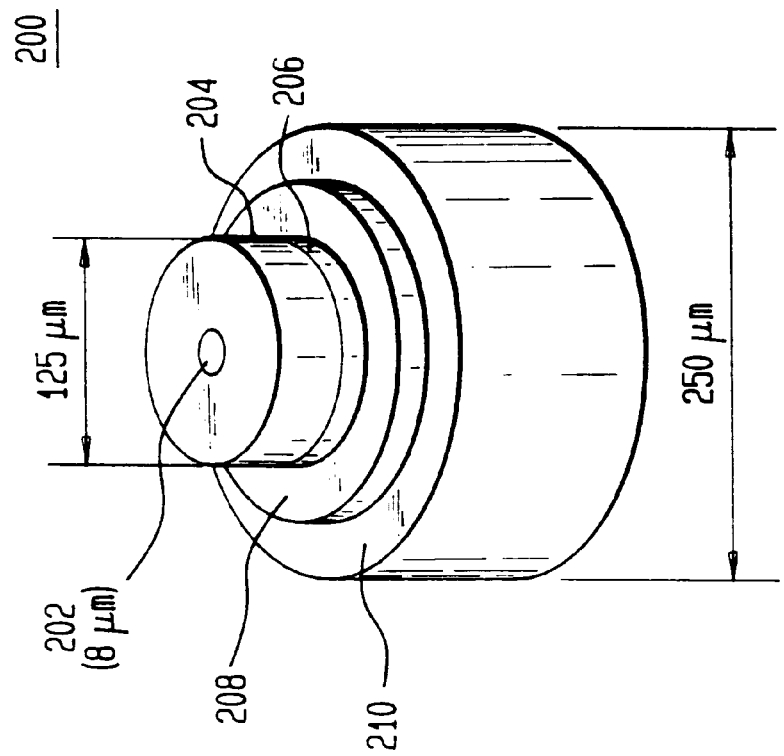

Fiber 100 also has a conventional polymer protective layer 108 (62.5 $\mu$m in depth) for mechanical strength, surrounding core-cladding assembly 102–104 and thin quasi metal oxide film 106. As would be apparent to a person skilled in the relevant art various diameters and additional silica-based cladding and polymer layers can be used without deviating from the spirit of the invention. For example, as shown in FIG. 2(B), a fiber 200 also includes a core 202, a cladding 204, and a thin quasi metal oxide film 206, in addition fiber 200 has dual protective polymer layers, primary layer 208 and secondary layer 210. Secondary layer 210 has a modulus higher than that of primary layer 208.

The reagents of thin quasi metal oxide film 106/206 are deposited on the outer surface of the core-cladding assembly 102–104/202–204 by any number of conventional low cost, chemical processes, including spraying the reagents on core-cladding assembly 102–104/202–204 fiber after draw, running assembly 102–104/202–204 through a reagent solution, mixing the reagents with the resin of polymer layer 108/208, exposing assembly 102–104/202–204 to a reagent vapor, incorporating the reagents into additional polymeric coatings, or absorbing reagents into sol-gel-cladding preforms. In addition, the thin quasi metal oxide film 106/206 can be deposited on outer surface by applying complexes, clusters, or polymers of such reagents.

Thin quasi metal oxide film 106/206 significantly improves both the chemical (i.e., corrosion) and mechanical (i.e., incidental abrasion resistance) performance characteristics of fiber 100/200. Particularly, the present invention achieves higher strengths for aged fibers, as compared to conventionally treated fibers. Corrosion or zero stress aging, involves dissolution of the cladding silica surface (e.g., cladding 104/204). Corrosion is particularly a problem for long-term aging or aging in corrosive environments (e.g., liquid water, ammonia, or other corrosive agents). While the current understanding of strength degradation in conventional fibers with and without polymer layers remains limited, topographical characterization with an atomic force microscope (AFM) has shown that an increase in the cladding surface roughness after aging, correlates with a fiber strength decrease. Furthermore, the shape and size of surface flaws have been correlated with fiber strength. It is also known that the polymer layer can influence the dissolution rate of the cladding surface.

As will be discussed in further detail below, thin quasi metal oxide film 106/206 retards the dissolution rate of the surface of cladding 104/204, thereby leading to improved aging performance. Long-term aging, at high temperatures, promotes hydrolysis or oxidation of quasi metal oxide film 106/206. As a result, the organic reagents of film 106/206 are substantially removed and a bond (Si—O—M) is formed between a quasi metal oxide film and the surface of cladding 104/204. The deposited film 106/206, as such, improves aging performance of fiber 100/200 by effectively blocking corrosive reactive sites from developing on/in the surface of cladding 104/204.

Resistance to incidental abrasions is also achieved by thin quasi metal oxide film 106/206. Even at 10 nm in depth, tin oxide (SnO), for example, improves the strength performance of glassware with defects 15000 times its thickness.

Upon removal of polymer layer 108/208, the protective quasi metal oxide film 106/206 remains on the surface of cladding 104/204. Moreover, during operations like fusion splicing, the quasi metal oxide film may further react, leaving a mechanically robust metal oxide on or incorporated in the silica near the surface of cladding 104/204. Accordingly, fiber 100/200 provides enhanced process yields and mechanical reliability.

The "quasi metal oxide" of film 106/206 is a material comprising primarily metal oxide, but which also may contain residual ligand. The reagents that form the quasi metal oxide film preferably include metals such as aluminum III (Al), titanium IV (Ti), tin II (Sn), and zirconium IV (Zr) bound to any number of ligands such as alkoxides, carboxylates, halides, oxides, or β-diketonates.

As would be apparent to a person skilled in the relevant art any number of metals can be employed, which are transition or lanthanide series elements, such as hafnium (Hf), zinc (Zn), lead (Pb), or bismuth (Bi). Similarly, the ligand can include isobutoxide, isopropoxide, and other alkoxides or octanoate, acetate, and other carboxylates. Indeed, any organo-metallic compound-based with the general formula $M:R_{(n)}$ can be used where M is a metal (as discussed above) and R is a $C_1$–$C_{12}$ alkoxide ligand coordinated with said metal, and (n) is 1, 2, 3, or 4.

The inventors have conducted a series of experiments with silica-based fibers in accordance with this first embodiment of the present invention. The following results illustrate some of the characteristics and advantages of thin quasi metal oxide films.

These experiments generally included five types of fiber: control fibers (bare silica-based core-cladding assemblies), three varieties of thin quasi metal oxide filmed fibers, and silane treated fibers to verify that it is the quasi metal oxide reagents which improve mechanical performance, rather than merely the film treatment. In addition, experiments included two varieties of silica fibers doped with reagents in the cladding, rather than with a quasi metal oxide film.

Thin films (~10 nm) of quasi metal oxides were deposited (2% by weight or less) from toluene solutions of titanium (IV) isopropoxide on core-cladding assembly of one set of fibers. Similarly, aluminum isopropoxide (Aldrich Chemical Co., Inc.) was deposited on another set. The third set of fibers had quasi metal oxides (5% by weight) of tin (II) octoate (Pfaltz and Bauer, Inc.) deposited. The mechanical strength of these fibers after aging were then compared to bare assemblies (i.e., control fibers) or assemblies treated with methyl triethoxy silane. Furthermore, the titanium and aluminum filmed fibers were compared with fibers produced by doping the silica surface of the cladding itself, with metal reagents (titania and alumina).

To illustrate the aging process, the surfaces the fiber cladding were characterized by x-ray photoelectron spectroscopy (XPS) and atomic force microscope (AFM), before and after aging. As will be discussed, the results indicate that the quasi metal oxide films transform into more protective coatings during aging at elevated temperatures.

The fibers were aged at 120° C./100% rh by placing them in a Highly Accelerated Temperature and Humidity Test Stress Test System (HAST System), model TPC-422M, from Espec, Inc. The fibers were also aged at 85° C./85% rh in a Humidity Cabinet, model LHL-112, from Espec. In addition, the fibers were aged at 90° C. in deionized water.

Figure 3A:
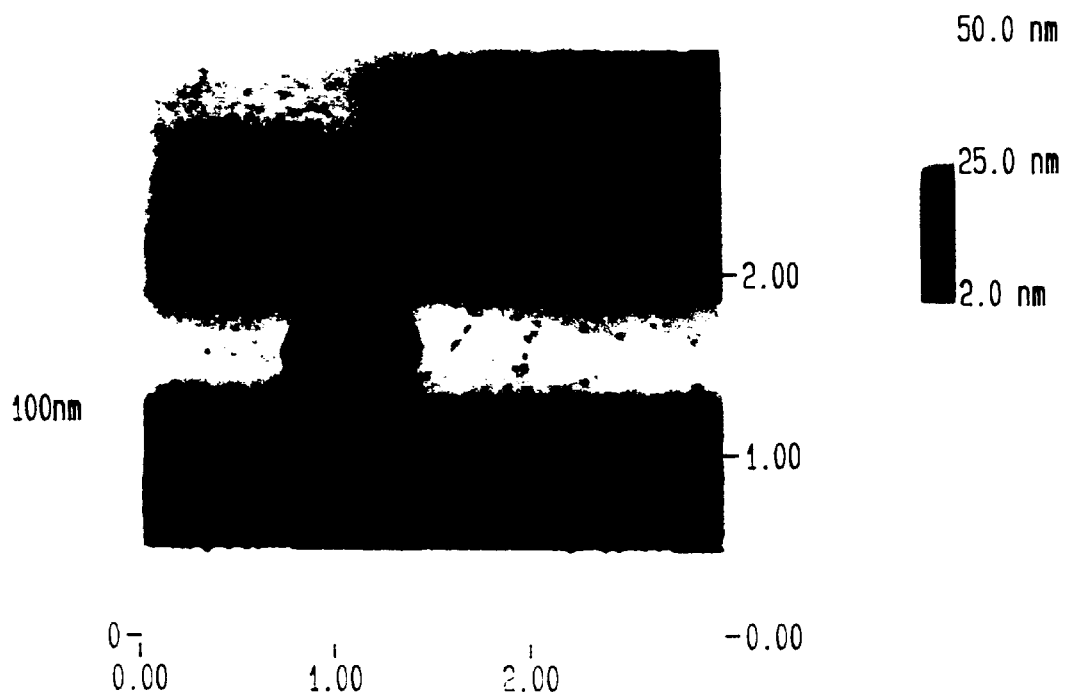
FIGS. 3(A)–(D) are atomic force microscope (AFM) images of silica fibers after aging, in particular, a bare silica fiber (i.e., control), a fiber with a silane based film, a fiber with an aluminum (Al) based thin film, and a fiber with a tin (Sn) based thin film, respectively.
Figure 3B:
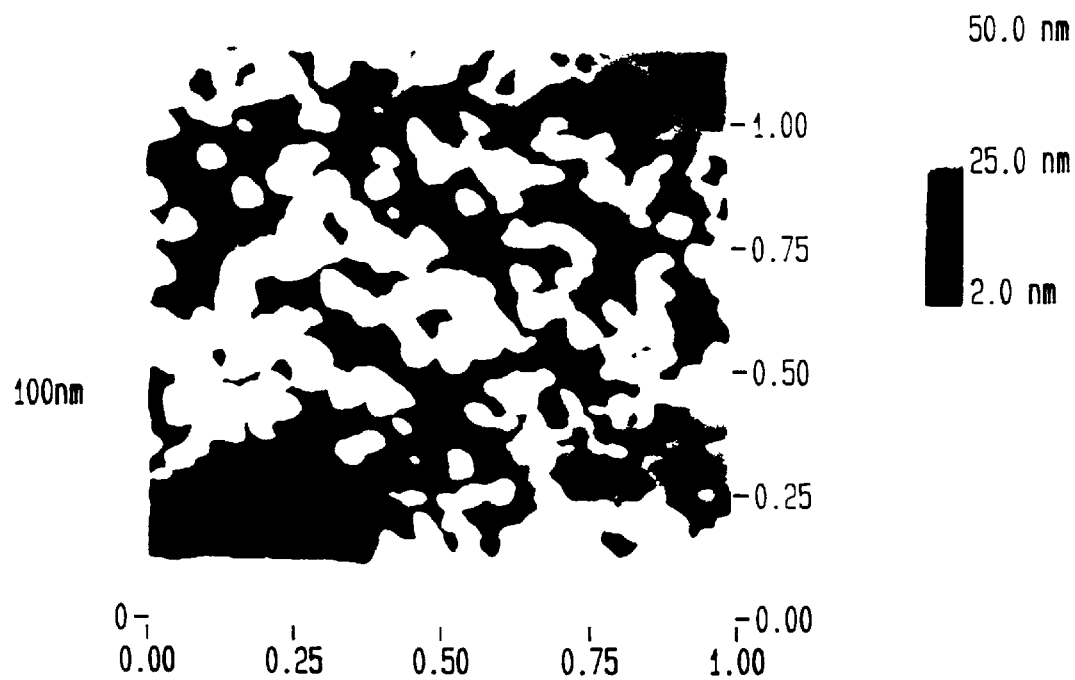

FIGS. 3(A)–(D) are representative images of four fibers (control, silane, and two quasi metal oxide treated surfaces) aged 500 hours at 120° C./100% rh. The lighter shading denotes higher points and the darker shading denotes lower points in the surface topography. As shown in FIG. 3(A), severe pit holes have been formed by the selective dissolution of the cladding silica surface. These isolated pit holes are the sites where the surface has been chemically attacked by the water molecules. The surface pit holes are up to hundreds of nm in diameter and tens of nm in depth. While a general surface roughness is usually observed for shorter aging times, over long aging and in chemically aggressive environments, selective chemical attacks dominate the surface topography. FIG. 3(B) show the silane treated surface with unique horizontal channels (i.e., in the plane) in the deposited layer. Typical peak to valley distances are 20 nm and the channels are ~100 nm wide.

Figure 3C:
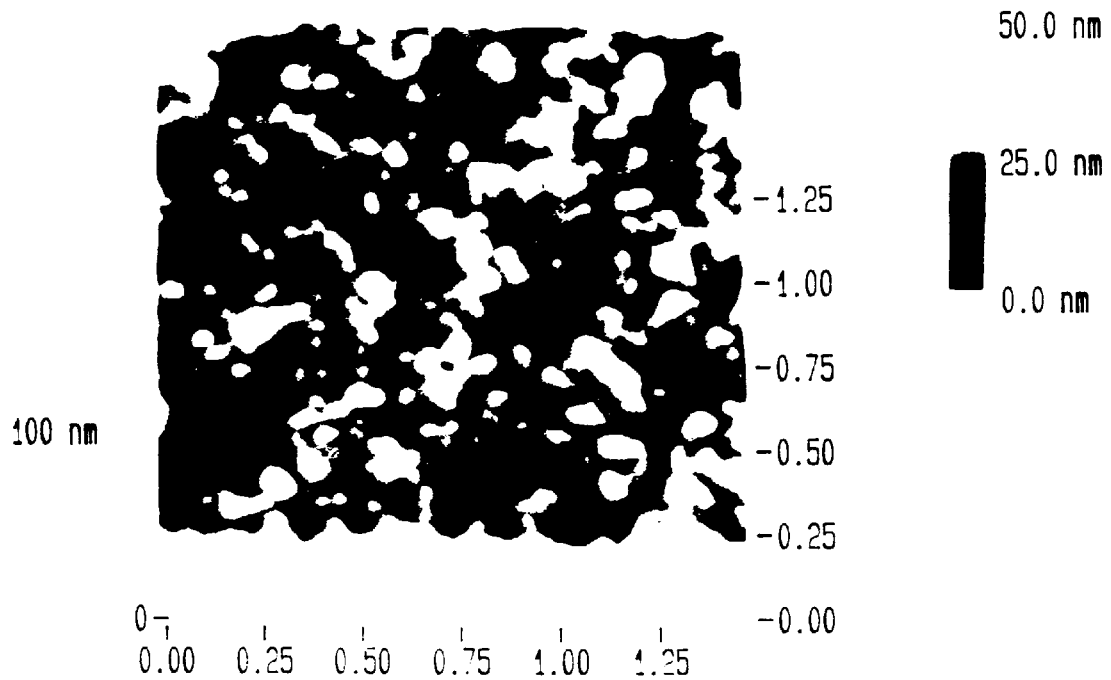
Figure 3D:
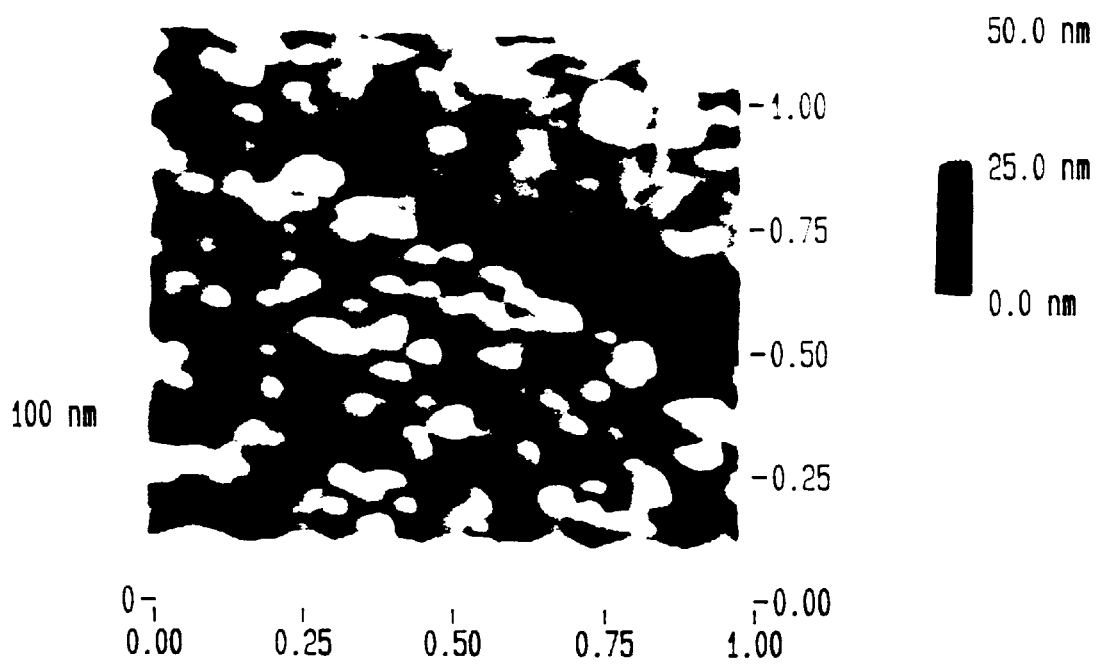

FIGS. 3(C)–(D), in contrast, illustrates the three filmed fibers after aging. The common attribute in all three images is a uniform topography (which is not as rough as the initial pre-aged surface) and no evidence of pit holes or channels. Moreover, the peak to valley distances are less than 10 nm with these fibers. Correspondingly, these treated fibers maintained more of their pre-aged mechanical strength as a result of the quasi metal oxide reagents binding the silica and retarding corrosion.

The fiber surfaces, before and after aging at 120° C./100% rh for 500 hours, were also characterized with XPS. Survey and high resolution core level spectra were acquired with a PHI 5600 series spectrometer (Physical Electronics, Inc.). The fibers were placed such that their axis were perpendicular to the detector entrance, resulting in a photoelectron take-off angle of 90°. In such a configuration, the maximum penetration depth was achieved, and 95% of the signal came from the top 10 nm of the surfaces. The detection area was 800 μm by the diameter of the fiber. The surface compositions of the fibers were calculated from the integrated area of the core level peaks of each element using known sensitivity factors.

In all the quasi metal oxide treated fibers, silicon was observed, indicating that the photoelectrons from both the film and silica surface were detected. These photoelectrons originated from a maximum depth of approximately 10 nm into the fiber and therefore set an upper limit of measurable film thickness and/or continuity. In addition, to the topographical characterization by AFM, discussed above, these results indicate that the thin films provided full surface coverage before and after aging.

Table 1 summarizes the percent atomic concentrations at the cladding surfaces for unaged and aged fibers. While the AFM results show the topography, these results indicate that a chemical change in the quasi metal oxide film has occurred, resulting in a quasi metal oxide film being bonded to the cladding surfaces.

TABLE 1

Atomic Concentration (in Relative Percentage) of Silica Optical Fiber Surfaces

|       | Treatment | M    | Si    | C     | O     | N    |
|-------|-----------|------|-------|-------|-------|------|
| Unaged | Control  | —    | 21.5  | 25.9  | 51    | 1.7  |
|       | Sn        | 1.97 | 21.4  | 26.5  | 48.7  | 1.4  |
|       | Al        | 3.8  | 19.07 | 29.85 | 46.42 | 0.5  |
|       | Ti        | 4.63 | 7.08  | 45.1  | 38.45 | 4.35 |
|       | Si        | —    | —     | —     | —     | —    |
| Aged* | Control   | —    | 26.73 | 13.53 | 58.43 | 1.31 |
|       | Sn        | 3.71 | 26.72 | 10.03 | 59.54 | 0    |
|       | Al        | 8.34 | 19.79 | 10.88 | 60.99 | —    |
|       | Ti        | 8.55 | 18.95 | 15.27 | 57.23 | —    |
|       | Si        | —    | 30.09 | 12.12 | 57.79 | —    |

*Aged for 500 hours at 120° C./100% rh.

As shown, similar concentration changes were observed for all the quasi metal oxide treated fibers. The small amount of nitrogen observed with unaged fibers is a contaminant from the nitric acid used to remove the protective polymer layers (Borden, Inc.) from the fibers used in these experiments or from the residue from the polymer layers themselves. Large amounts of carbon were observed on the surface of the treated fibers before aging. After aging, the carbon levels decreased by a factor of three. The relative atomic metal concentrations increased by a factor of two and the oxygen concentrations increased by ~30%.

Figure 4:
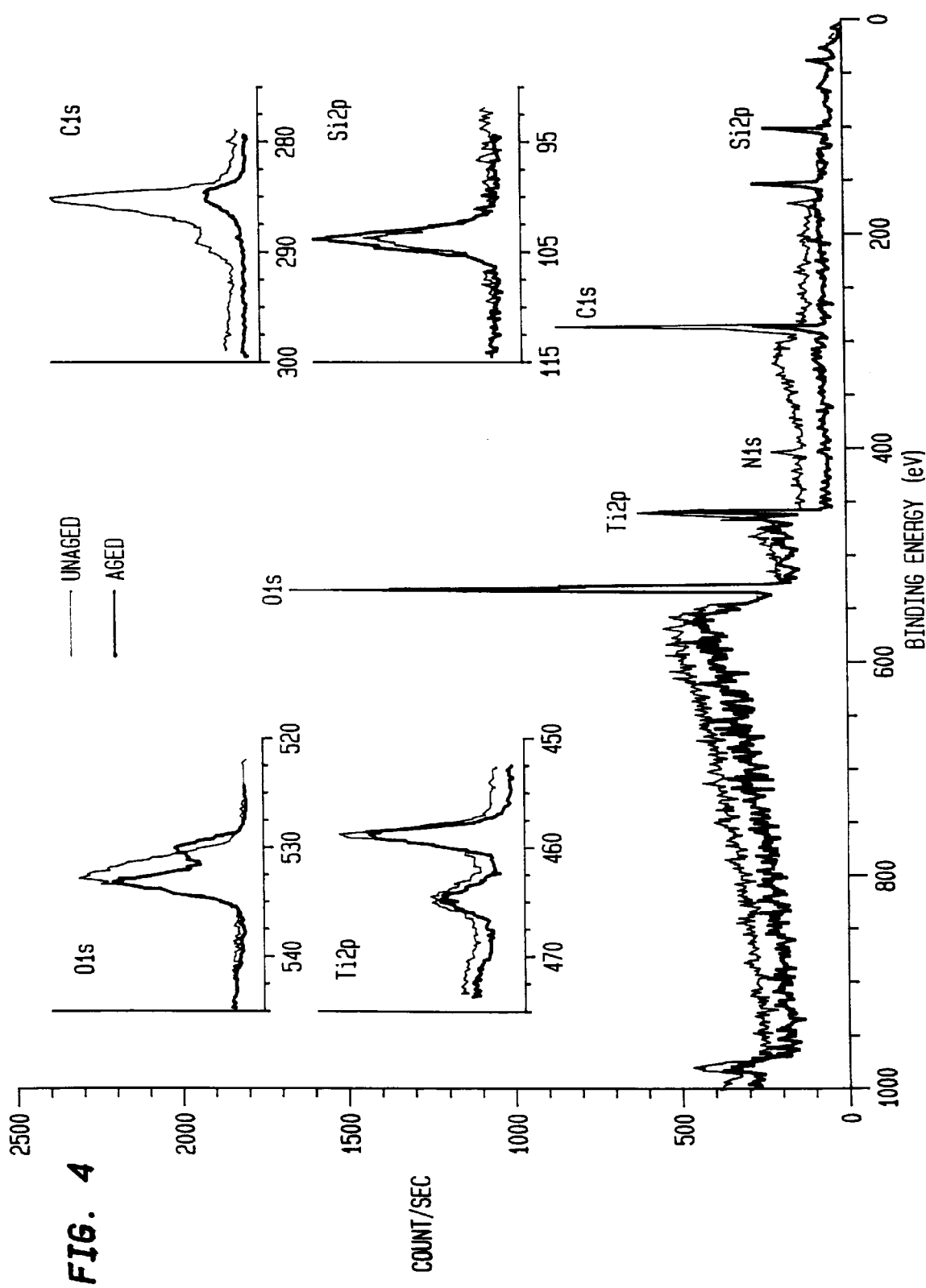
FIG. 4 is a x-ray photoelectron spectroscopy (XPS) survey and core level spectra of a silica fiber with a titanium (Ti) based thin film, before and after aging.

FIG. 4 shows a survey and core level spectra of the titanium coated fibers before and after aging, indicating the change in the relative ratios of carbon, oxygen, silicon, and titanium. The Ti2p high resolution spectra shows that the absolute signal from Ti is constant (i.e., no loss of Ti). The decrease in the absolute intensity of the C1s is peak indicates that there was a loss of organic components. This is also supported by the increase of the Si2p signal (indicating a thinner overlayer). The two peaks in the O1s spectrum after aging come from the $SiO_2$ (high binding energy) and the $TiO_2$ (low binding energy). This supports the conclusion that quasi metal oxide titanium is converted to titanium oxide ($TiO_2$) (i.e., quasi metal oxide film) on/in the surface with aging. Similar analyses can be made for the other two quasi metal oxide treated fibers.

In addition, the dynamic fatigue of the fibers was tested. The quasi metal oxide treated fibers were fractured in air and compared to the fracture strains of the control and silane fibers. Before aging, there was essentially no differences in strength of these fibers. Thus, the fatigue rates were not retarded by the surface treatments. After aging, the fibers were fractured using a Fibre Sigma two-point bending apparatus. The two-point bender was operated at 1000 μm/sec in air, unless noted otherwise. A minimum of 10 fibers of each type were fractured and the median failure strains are shown in FIG. 5.

Figure 5:
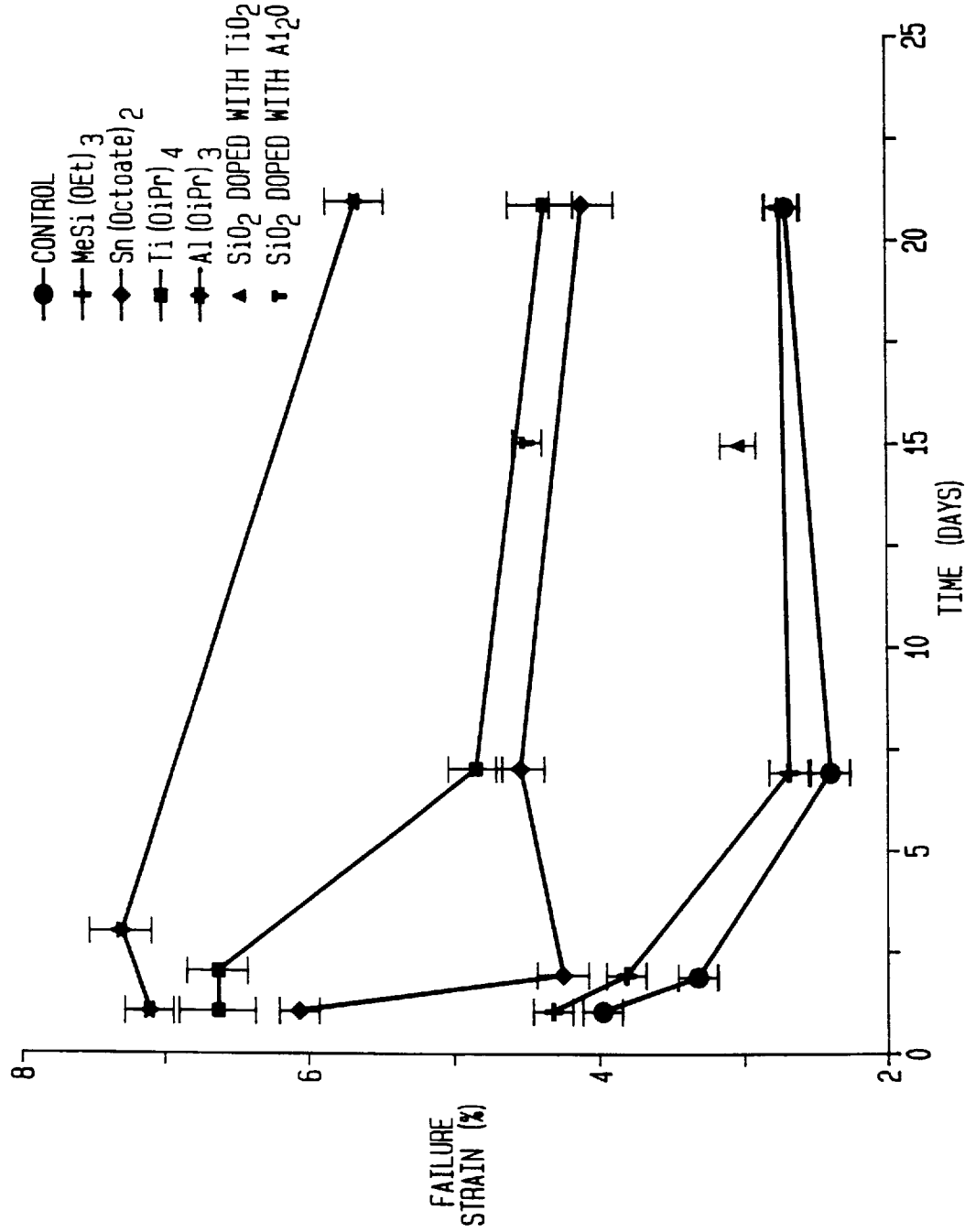
FIG. 5 is a failure strain diagram plotted as a function of aging time.

In FIG. 5, the median fracture strains are plotted as a function of aging time. The initial fracture strain of all samples is ~8%. After aging for one day, the failure strain of the control and the silane treated fiber decreased by 50%. The other fibers also decrease in strength, but only by 10%–20%. After 7 days the strength of the control and the silane treated fibers decrease another 40%. The titanium treated fibers, however, only decrease by 10%. No statistically significant strength change was observed for either the aluminum or tin treated fibers.

After 21 days of aging the same rank ordering was observed. The failure strain of the control was ~3% while that of the aluminum treated fiber was 5.7%. The titanium treated fibers was ~4.2%, thus still substantially stronger than the control. The tin treated fibers showed an interesting performance in that they lost ~50% of their strength after 2 days of aging, but their strength level remains approximately constant out to 21 days. The performance of the silane coated fibers mirrored that of the control fibers. The silane fiber were only moderately stronger and failed at a statistically equivalent fracture strain at the end of 21 days of aging.

In summary, FIG. 5 demonstrates that silica fibers treated with any of the three quasi metal oxide reagents retained more of their strength over aging than the bare control fibers and the silane treated fibers. The silane fiber results indicate that mechanical performance is not improved by merely treating the fibers with any reagent.

Furthermore, FIG. 5 indicates that the aging performance of the quasi metal oxide treated fibers exceed that of bare titania doped silica fibers and 10% alumina doped silica fibers. Note that for these aging times, the predicted fracture strain is larger for each of the respective quasi metal oxide treated surface than its fiber doped counterpart. Thus, the present invention provide superior corrosion protection in comparison to conventional solutions (e.g., doping the cladding layer).

Tables 2 and 3 summarize aging at 85° C./85% rh and 85° C. in liquid water respectively. Similar trends to the 120° C./100% rh results are observed. The control and the silane treated fibers were the poorest performers. The Al and Ti performed the best, though the Ti apparently performs moderately better in water than the Al. The Sn treated fiber appeared to be slightly better than the control.

TABLE 2

Failure Strain of Fibers Aged at 85° C./85% rh for 30 Days

| Fiber Type | Mean Failure Strain (%) | Median Failure Strain (%) | Standard Deviation of the Mean |
|---|---|---|---|
| Al (OiP)$_3$ | 6.8 | 7.2 | 0.3 |
| Ti (OiP)$_4$ | 6.9 | 7.4 | 0.6 |
| Sn (Octoate)$_2$ | 6.4 | 6.5 | 0.3 |
| MeSi (OEt)$_3$ | 5.3 | 5.2 | 0.6 |
| Control | 5.6 | 5.9 | 0.6 |

OiP is isopropoxide.

TABLE 3

Failure Strain of Fibers Aged at 85° C./$H_2O_{(l)}$ for 30 Days.

| Fiber Type | Mean Failure Strain (%) | Median Failure Strain (%) | Standard Deviation of the Mean |
|---|---|---|---|
| Al (OiP)$_3$ | 5.1 | 5.4 | 0.2 |
| Ti (OiP)$_4$ | 5.6 | 5.7 | 0.1 |
| Sn (Octoate) | 5.4 | 5.5 | 0.1 |
| Control | 4.7 | 4.9 | 0.2 |

OiP is isopropoxide.

These aging results clearly indicate that thin quasi metal oxide films significantly improve the mechanical (i.e., corrosion) performance of silica fibers. Furthermore, the film treated fiber also out perform its fiber doped counterpart. Therefore, depositing quasi metal oxide on the silica surface is more effective than doping the fiber itself. The predominate reasons for this is that the conventional solutions cannot block the corrosive surface sites.

Figure 6:
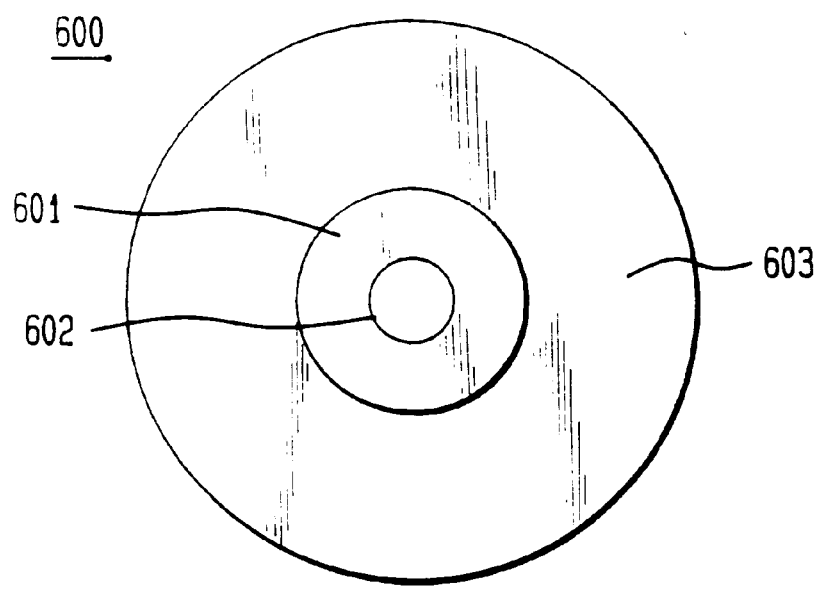
FIG. 6 illustrates a cross sectional end view of a silica fiber 600 with quasi metal oxide reagents in a polymer layer 608.

Another preferred embodiment of the present invention is shown in FIG. 6. An optical fiber 600 includes a core 602, a cladding 604, and a quasi metal oxide doped polymer layer 608. As noted above, in lieu having additional processing steps to deposit the reagents directly on the outer surface of cladding 604 during fiber fabrication, polymer layer 608 is used to deliver the quasi metal oxide reagents to the surface of cladding 604.

For example, 2 or 5 wt % of aluminum (III)-sec-butoxide (Al(OsB)$_3$) was blended with either a primary or secondary fiber coating resin and applied to the surface of the fiber on the draw tower immediately after drawing the fiber. In one case, a secondary coating resin which did not contain any Al additives, was coated over the Al containing primary resin to give a dual-coated fiber. In a second case, the Al containing secondary resin was applied as a single coat to the fiber. After coating, the resins were UV cured on the fiber.

The fibers were aged at 120° C./100% rh for up to 21 days. In FIG. 7, the median failure strain of the fibers coated with Al containing resins are plotted as a function of aging time and compared to control fibers. After 21 days, the fibers with 2 wt % Al(OsB)$_3$ in either the primary or secondary coating maintained 85% of their initial strength and the fiber doped with 5 wt % (Al(OsB)$_3$ in the primary coating maintained 75% of its strength. Both the single- and dual-coat control fibers lost half of their initial strength in the same time period. In summary, FIG. 7 demonstrates that the use of a polymer layer to deliver metal-organic reagents to the surface of the fiber results in the same corrosion resistance obtained by directly coating the metal-organic reagents on the fiber.

Figure 8C:
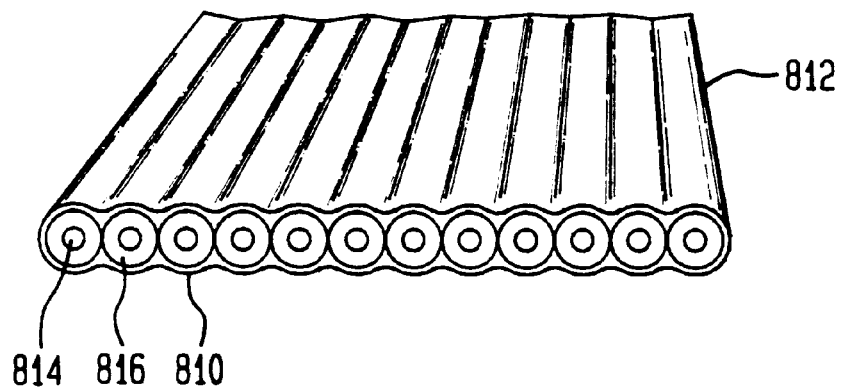
FIGS. 8(A)–(C) illustrate cross sectional end views of fiber optic cables 800–802 and a fiber ribbon 812 with quasi metal oxide reagents in a filler material 808 of cables 800–802 and a matrix polymer 810 of the ribbon 812.

Similarly, as would be apparent to one skilled in the relevant art that the quasi metal oxide reagents, for example titanates, can be also added as adhesion promoters. Currently, most adhesion promoters are alkoxy organo silanes. Since the strength and aging performance of the silane treated fibers are only, at best, as good as the control fibers, the addition of quasi metal oxides would significantly improve the mechanical reliability of fibers. Alternatively, these reagents can be integrated into a tertiary coating that is conventionally used for color coding fiber cables. Similarly, as shown in FIG. 8(C), a fiber ribbon 812 having a plurality of fiber core-cladding assemblies 814 each having a polymer layer 816 has the reagents integrated in a matrix polymer 810.

Figure 8A:
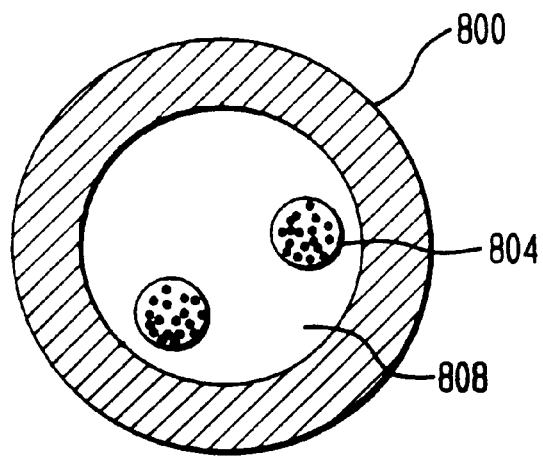
Figure 8B:
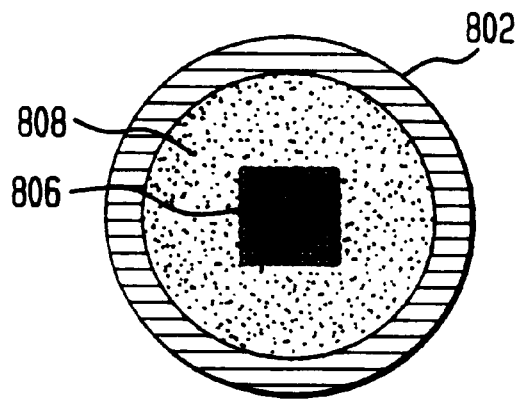

Another embodiment of the present invention is shown in FIGS. 8(A)–(B). Fiber optic cables 800-802 have fiber bundles 804 and a fiber ribbon core 806, respectively, surrounded by a filler material 808 which is typically an oil-extended rubber-type filling compound. In this embodiment the quasi metal oxide reagents are integrated into filler material 808 to achieve the same protective effect discuss in the other embodiments.

As would also be apparent to one skilled in the relevant art, additional embodiments of the present invention would include ferrules, optical connectors, and other optical interconnections which include a thin quasi metal oxide film for corrosion protection.

While the present invention has been particularly shown and described with reference to several preferred embodiments thereof, it will be apparent to a person skilled in the relevant art that various changes in form and details may be made therein without departing from the spirit and scope of the invention as defined in the appended claims.

What is claimed is:

1. An article comprising:
    a silica substrate; and
    a quasi metal oxide layer coated on an outer surface of said silica substrate, wherein
        said quasi metal oxide layer primarily comprises at least one metal oxide, is less than 5 µm in thickness and protects the article against corrosion, the quasi metal oxide layer formed from a molecular species which adheres to the outer surface of said silica substrate, and
        said quasi metal oxide layer includes at least one ligand selected from a group consisting of alkoxides, carboxylates, halides, β-diketonates, and oxides.

2. The article of claim 1, wherein the metal component of said quasi metal oxide is selected from the group consisting of Ti, Zr, Hf, Al, Sn, Zn, Pb, and Bi.

3. The article of claim 1, wherein the metal component of said quasi metal oxide is a first row transition metal.

4. The article of claim 1, wherein the metal component of said quasi metal oxide is a lanthanide series metal.

5. The article of claim 1, wherein the article is a fiber.

6. The article of claim 1, wherein the article is an optical fiber.

7. The article of claim 1, wherein the article is an optical connector.

8. The article of claim 1, wherein the article is a ferrule.

9. The article of claim 1, wherein said silica substrate comprises:
    a core having a refractive index; and
    a cladding, surrounding said core, having a lower refractive index than said core, wherein an outer surface of the cladding forms said outer surface of the silica substrate.

10. The article of claim 1, wherein said quasi metal oxide layer is approximately 10 nm in thickness.

11. The article of claim 1, wherein said quasi metal oxide layer is formed from a metal cluster material which delivers a metal component of the metal oxide to the outer surface of the substrate.

12. An article comprising:
    a silica substrate; and
    a quasi metal oxide layer coated on an outer surface of said silica substrate, wherein
        said quasi metal oxide layer is formed by applying a coating comprising a reagent that is a metal bound to a ligand on the outer surface of said silica substrate and oxidizing or hydrolyzing the reagent to form said quasi metal oxide layer on the outer surface of said silica substrate, the reagent formed from a molecular species; and
        said quasi metal oxide layer primarily comprises at least one metal oxide, is less than about 5 µm in thickness, and protects the article against corrosion.

13. The article of claim 12, wherein the metal component of said quasi metal oxide is selected from the group consisting of Ti, Zr, Hf, Al, Sn, Zn, Pb, and Bi.

14. The article of claim 12, wherein the metal component of said quasi metal oxide is a first row transition metal.

15. The article of claim 12, wherein the metal component of said quasi metal oxide is a lanthanide series metal.

16. The article of claim 12, wherein said quasi metal oxide layer includes a ligand selected from the group consisting of alkoxides, carboxylates, halides, β-diketonates, and oxides.

17. The article according to claim 12, wherein the step of applying a coating comprises spraying the reagent on said silica substrate.

18. The article according to claim 12, wherein the step of applying a coating comprises dipping said silica substrate in a solution of the reagent.

19. The article according to claim 12, wherein the step of applying a coating comprises exposing said silica substrate to a vapor of the reagent.

20. The article according to claim 12, wherein the step of applying a coating comprises incorporating the reagent into a polymeric coating on said silica substrate.

21. The article according to claim 12, wherein the step of applying a coating comprises absorbing the reagent into sol-gel-cladding preforms.

22. The article according to claim 12, wherein the step of applying a coating comprises applying complexes, clusters or polymers of the reagent to said silica substrate.

* * * * *